US011971675B2

(12) United States Patent
Kasamai et al.

(10) Patent No.: US 11,971,675 B2
(45) Date of Patent: Apr. 30, 2024

(54) IMAGE FORMING APPARATUS IN WHICH ROTATIONAL POSITION OF IMAGE BEARER IS CONTROLLED TO REDUCE DENSITY UNEVENNESS

(71) Applicants: Masashi Kasamai, Kanagawa (JP); Koji Kiryu, Tokyo (JP); Masahiro Ashikawa, Kanagawa (JP); Jumpei Yamaguchi, Kanagawa (JP); Kanji Ubukata, Kanagawa (JP); Nagisa Nakamura, Shizuoka (JP)

(72) Inventors: Masashi Kasamai, Kanagawa (JP); Koji Kiryu, Tokyo (JP); Masahiro Ashikawa, Kanagawa (JP); Jumpei Yamaguchi, Kanagawa (JP); Kanji Ubukata, Kanagawa (JP); Nagisa Nakamura, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/059,579

(22) Filed: Nov. 29, 2022

(65) Prior Publication Data

US 2023/0195017 A1 Jun. 22, 2023

(30) Foreign Application Priority Data

Dec. 20, 2021 (JP) ................................ 2021-206019

(51) Int. Cl.
*G03G 15/00* (2006.01)

(52) U.S. Cl.
CPC ................................ *G03G 15/5025* (2013.01)

(58) Field of Classification Search
CPC ........... G03G 15/5025; G03G 15/0189; G03G 15/5008; G03G 15/505; G03G 15/5058; G03G 2215/0106
See application file for complete search history.

(56) References Cited

U.S. PATENT DOCUMENTS

2005/0019065 A1* 1/2005 Wasai ................ G03G 15/0194 399/301
2006/0002745 A1* 1/2006 Iwasaki .............. G03G 15/5008 399/299

(Continued)

FOREIGN PATENT DOCUMENTS

JP 2011-081171 4/2011
JP 2020-177098 10/2020

OTHER PUBLICATIONS

U.S. Appl. No. 17/731,280, filed Apr. 28, 2022, Jumpei Yamaguchi, et al.

(Continued)

*Primary Examiner* — Sandra Brase
(74) *Attorney, Agent, or Firm* — IPUSA, PLLC

(57) ABSTRACT

An image forming apparatus includes image bearers, motors, a reference position detector, and processing circuitry. The circuitry senses a density of a toner image on each bearer; forms an image pattern and senses, based on a detection result of the detector and a sensing result of the density, density unevenness in a rotation cycle and a phase of the density unevenness with respect to a rotational position reference of each bearer; calculates a target phase based on the phase sensed; calculates a relative phase difference based on a rotational position and the target phase of each bearer; selects, as a reference image bearer, an image bearer having a minimum phase correction value, based on a calculation result of the difference; and controls the rotational position of each of the other image bearers with respect to the reference image bearer to the phase correction value, with the motors being driven.

4 Claims, 11 Drawing Sheets

(56) References Cited

U.S. PATENT DOCUMENTS

| | | | | |
|---|---|---|---|---|
| 2007/0059041 | A1* | 3/2007 | Iwasaki | G03G 15/5008 399/167 |
| 2013/0121715 | A1 | 5/2013 | Ashikawa et al. | |
| 2014/0255063 | A1 | 9/2014 | Kiryu | |
| 2014/0306633 | A1 | 10/2014 | Ashikawa | |
| 2017/0153658 | A1 | 6/2017 | Kasamai et al. | |
| 2018/0093841 | A1 | 4/2018 | Momose et al. | |
| 2021/0278785 | A1 | 9/2021 | Ashikawa | |

OTHER PUBLICATIONS

U.S. Appl. No. 17/876,562, filed Jul. 29, 2022, Nagisa Nakamura, et al.

* cited by examiner

IMAGE FORMING APPARATUS IN WHICH ROTATIONAL POSITION OF IMAGE BEARER IS CONTROLLED TO REDUCE DENSITY UNEVENNESS

CROSS-REFERENCE TO RELATED APPLICATION

This patent application is based on and claims priority pursuant to 35 U.S.C. § 119(a) to Japanese Patent Application No. 2021-206019, filed on Dec. 20, 2021, in the Japan Patent Office, the entire disclosure of which is hereby incorporated by reference herein.

BACKGROUND

Technical Field

The present disclosure relates to an image forming apparatus.

RELATED ART

A tandem-color image forming apparatus having a plurality of photoconductive drums serving as image bearers may cause cyclic image density unevenness occurring in the photoconductor circumferential length due to, for example, the eccentricity of the photoconductive drums.

For example, a configuration is known in which the cycle unevenness of a photoconductive drum is detected and the target speed is varied so as to correct the cycle unevenness.

SUMMARY

In an embodiment of the present disclosure, an image forming apparatus includes a plurality of image bearers, a plurality of motors, a reference position detector, and processing circuitry. The plurality of motors drive to rotate the plurality of image bearers in one-on-one correspondence. The reference position detector detects a rotational position of each of the plurality of image bearers. The processing circuitry senses a density of a toner image formed on each of the plurality of image bearers; forms a predetermined image pattern and senses, based on a detection result of the reference position detector and a sensing result of the density of the toner image, density unevenness in a rotation cycle of each of the plurality of image bearers and a phase of the density unevenness with respect to a rotational position reference of each of the plurality of image bearers; calculates, based on the phase of the density unevenness sensed, a target phase of each of the plurality of image bearers; calculates, based on the rotational position detected by the reference position detector and the target phase calculated, a relative phase difference of each of the plurality of image bearers; selects, as a reference image bearer, an image bearer having a phase correction value that is minimum among the plurality of image bearers, based on a calculation result of the relative phase difference; and controls the rotational position of each of the other image bearers, except for the reference image bearer selected, of the plurality of image bearers with respect to the reference image bearer to the phase correction value, with the plurality of motors being driven.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
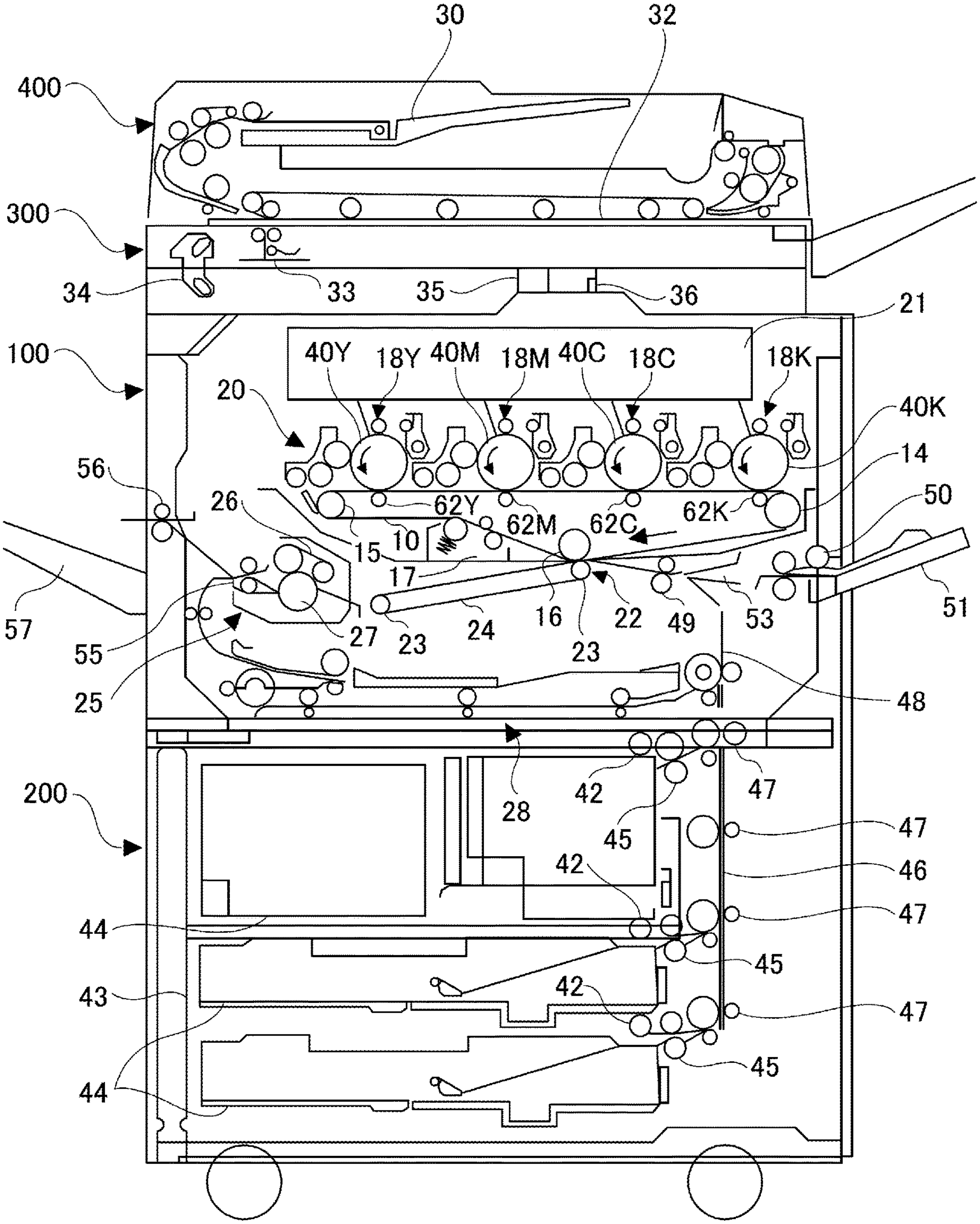
FIG. 1 illustrates a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION OF EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

In order to facilitate understanding of the description, the same constituent elements in the drawings are denoted with the same reference numerals as much as possible, and redundant description is not given.

Hereinafter, an electrophotographic image forming apparatus including a secondary transfer mechanism called a tandem type will be described as an example.

The image forming apparatus is a multifunction peripheral/printer/product (MFP) having a single housing in which, for example, a copy function, a print function, and a facsimile function are installed. Examples of the recording medium include a plain sheet typically used for copying; and a thick sheet such as an overhead projector (OHP) sheet, a card, and a postcard; and an envelope. Here, a sheet P will be described as an example of a recording medium.

Example of Configuration of Image Forming Apparatus 100

FIG. 1 illustrates an example of the configuration of an image forming apparatus 100 according to an embodiment, and is a cross-sectional view illustrating a main part of the image forming apparatus 100 according to the present embodiment. As illustrated in FIG. 1, the image forming apparatus 100 includes an intermediate transfer unit at the center, and the intermediate transfer unit includes an intermediate transfer belt 10 as an endless belt. The intermediate transfer belt 10 is looped around a first support roller 14, a second support roller 15, and a third support roller 16 and rotationally driven clockwise.

The image forming apparatus 100 further includes an intermediate-transfer cleaning unit 17 on the left of the second support roller 15 among the first support roller 14, the second support roller 15, and the third support roller 16. The intermediate-transfer cleaning unit 17 removes residual toner remaining on the intermediate transfer belt 10 after image transfer.

An image former 20 includes a yellow (Y) image former, a magenta (M) image former, a cyan (C) image former, and a black (K) image former. The image former 20 faces part of the intermediate transfer belt 10 between the first support roller 14 and the second support roller 15. The image formers different in color are disposed along the movement direction of the intermediate transfer belt 10.

Note that the image formers different in color are similar in configuration except that the colors of toners in use are different. Thus, in the description and the drawings, the subscript "Y", "M", "C", or "K" indicating the corresponding color of toner in use may be omitted appropriately.

The image former 20 includes photoconductive drums (image bearers) 40 (40Y, 40M, 40C, and 40K) different in color, charging rollers 18 (18Y, 18M, 18C, and 18K), a developing unit, and a cleaning unit, and is detachably attached to the image forming apparatus 100.

In order to protect the inside of the image forming apparatus 100, the image forming apparatus 100 is provided with a cover that can be opened and closed by being inclined forward (frontward a sheet face). A user of the image forming apparatus 100 or a service person who performs maintenance of the image forming apparatus 100 can open the cover, access the inside of the image forming apparatus 100, and attach the image former 20 to or detach the image former 20 from a predetermined position in the image forming apparatus 100.

The image former 20 is, for example, a replaceable process cartridge drum unit (hereinafter, referred to as PCDU) according to the life of such a photoconductive drum 40 as described above.

The image forming apparatus 100 further includes a light beam scanner 21 above the image former 20. The light beam scanner 21 irradiates the photoconductive drums 40 different in color with a light beam (laser light) for image formation to form, one-to-one, electrostatic latent images according to image data on the photoconductive drums 40 different in color.

The respective electrostatic latent images of the photoconductive drums 40 different in color are developed by the developing unit. The developed toner images different in color are overlapped and primarily transferred onto the intermediate transfer belt 10. As a result, a color toner image is formed on the intermediate transfer belt 10. The toner image is borne on the intermediate transfer belt 10 as an example of an image bearer, and is moved along the movement direction of the intermediate transfer belt 10. The configuration of the image former 20 will be separately described in detail with reference to FIG. 2.

The image forming apparatus 100 further includes a secondary transfer unit 22 below the intermediate transfer belt 10. The secondary transfer unit 22 includes two rollers 23 and a secondary transfer belt 24 as an endless belt looped around the two rollers 23. The secondary transfer unit 22 is provided so as to push up the intermediate transfer belt 10 and press the intermediate transfer belt 10 against the third support roller 16. Onto the sheet P, the secondary transfer belt 24 can secondarily transfer the toner image on the intermediate transfer belt 10.

The image forming apparatus 100 further includes a fixing unit 25 on the side of the secondary transfer unit 22. The fixing unit 25 fixes the toner image on the sheet P conveyed with the toner image secondarily transferred, onto the sheet P. The fixing unit 25 includes a fixing belt 26 as an endless belt, a heating roller, and a pressure roller 27, and can fix the toner image transferred on the surface of the sheet P onto the sheet P by heat and pressure of the fixing belt 26 and the pressure roller 27.

The image forming apparatus 100 further includes a sheet reversing unit 28 below the secondary transfer unit 22 and the fixing unit 25. The sheet reversing unit 28 reverses the front and back of the sheet P and sends the sheet P to form an image on the back face of the sheet P immediately after the image is formed on the front face.

Next, a series of flow in which an image is formed on a sheet P in the image forming apparatus 100 will be described.

In response to press of the start button of "copy" of an operation device (not illustrated), in a case where a document is placed on a document feeding table 30 of an auto document feeder (ADF) 400 as a document automatic conveying device, the image forming apparatus 100 causes the ADF 400 to convey the document onto a contact glass 32. On the other hand, in a case where the document is not placed on the document feeding table 30, an image reading unit 300 including a first carriage 33 and a second carriage 34 is driven to read the document manually placed on the contact glass 32.

The first carriage 33 of the image reading unit 300 includes a light source that irradiates the contact glass 32 with light. Reflected light from the document surface is reflected toward the second carriage 34 by a first mirror included in the first carriage 33, and then is reflected by a mirror included in the second carriage 34. Then, due to the reflected light from the document surface, an image is formed on an image capturing face of a charge coupled device (CCD) 36 as a reading sensor by an imaging forming lens 35. The CCD 36 captures an image on the document surface, and image data of each color of Y, M, C, and BK is generated on the basis a signal of the image captured by the CCD 36.

In response to press of the start button of "print", an instruction for image formation from an external device such as a personal computer (PC), or instruction for outputting from facsimile (FAX), the image forming apparatus 100 starts driving rotationally the intermediate transfer belt 10 and prepares image formation by each unit of the image former 20.

Then, the image forming apparatus 100 starts an image forming process for each color. The photoconductive drums 40 different in color are each irradiated with laser light modulated based on image data of the corresponding color, and an electrostatic latent image is formed. Then, the toner images different in color resulting from development of the electrostatic latent images are overlapped as a single image on the intermediate transfer belt 10.

After the formation, at the timing when the leading end of the toner image on the intermediate transfer belt 10 enters the secondary transfer unit 22, the sheet P is sent to the secondary transfer unit 22 at a certain timing such that the leading end of the sheet P enters the secondary transfer unit 22. Then, the toner image on the intermediate transfer belt 10 is secondarily transferred onto the sheet P by the secondary transfer unit 22. The sheet P on which the toner image is secondarily transferred is sent to the fixing unit 25, and then the toner image is fixed onto the sheet P.

Here, feeding of each sheet P to the secondary transfer position will be described. Due to driving rotationally of one of sheet feeding rollers 42 of the sheet feeding table 200, such sheets P as described above are fed from one of the sheet feeding trays 44 provided in multiple stages in the sheet feeding unit 43. After the feeding, a single sheet is separated by a separation roller 45. The sheet enters a conveyance roller unit 46, and then is conveyed by the conveyance roller 47. After the conveyance, the sheet is guided to a conveyance roller unit 48 in the image forming apparatus 100. The sheet abuts against a registration roller 49 of the conveyance roller unit 48 and stops temporarily. Then, as described above, the sheet is sent toward the secondary transfer unit 22 in accordance with the timing of the secondary transfer.

Alternatively, the user can insert sheets P into a manual feeding tray 51 to feed each sheet P. In the case where the user inserts the sheets P into the manual feeding tray 51, the image forming apparatus 100 drives rotationally a sheet feeding roller 50 to separate a single sheet from the sheets P on the manual feeding tray 51 and retract the sheet into a manual feeding path 53. Then, in a manner similarly to the manner as described above, the sheet abuts against the registration roller 49 and stops temporarily. Then, the sheet is sent to the secondary transfer unit 22 at the timing of the secondary transfer.

The sheet P fixed and discharged by the fixing unit 25 is guided to an ejection roller 56 by a switching claw 55. The sheet P is ejected by the ejection roller 56, and then stacked on a sheet ejection tray 57. Alternatively, the sheet is guided to the sheet reversing unit 28 by the switching claw 55. Then, the sheet is reversed by the sheet reversing unit 28 and is guided to the secondary transfer position again. After the guidance, an image is also formed on the back surface of the sheet P. Then, the sheet P is ejected onto the sheet ejection tray 57 by the ejection roller 56.

The residual toner remaining on the intermediate transfer belt 10 after the image transfer is removed by the intermediate transfer cleaning unit 17, and is prepared for image formation again.

In such a manner, the image forming apparatus 100 can form a color image on the sheet P.

Configuration Example of Image Former 20

Next, a configuration of the image former 20 of the image forming apparatus 100 will be described with reference to FIG. 2.

Figure 2:
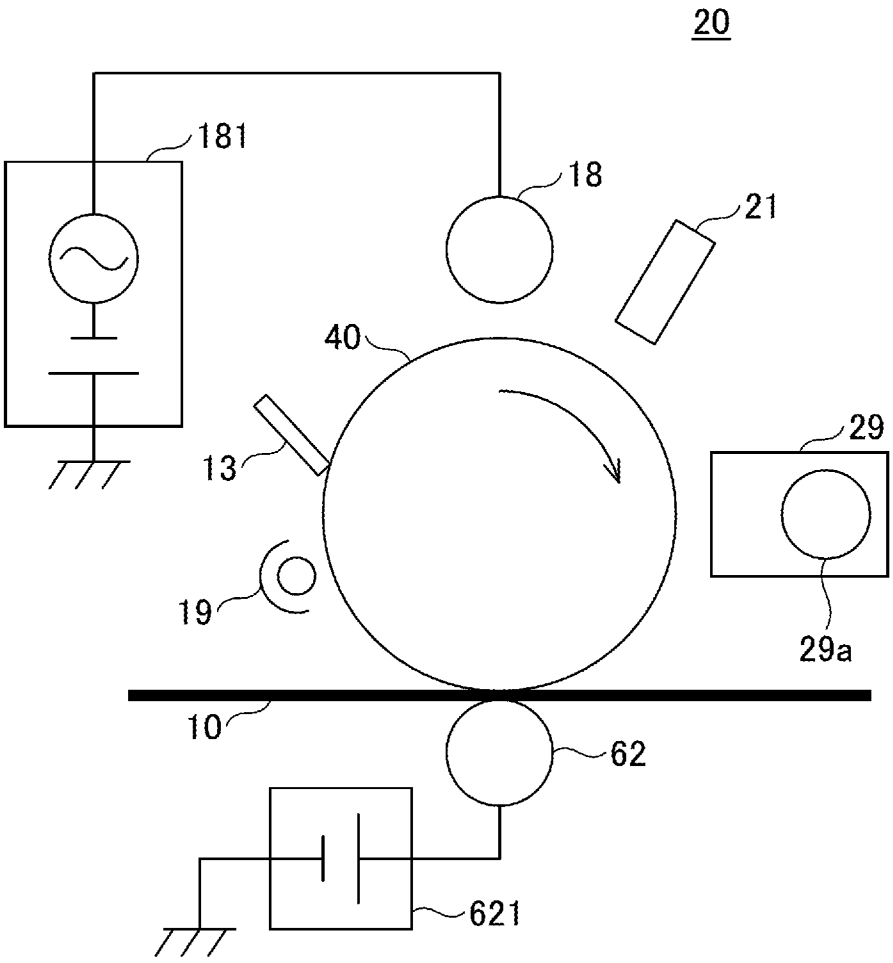
FIG. 2 illustrates an example of the configuration of an image former.

FIG. 2 illustrates an example of the configuration of the image former 20 and a configuration example of one of the image formers different in color. As described above, the image formers of the other three colors are similar in configuration to the illustrated image former except that the colors of toners in use are different. Thus, illustration and description of these image formers are not given, and the singe image former will be described. That is, the reference signs in FIG. 2 are represented by the subscripts “Y”, “M”, “C”, and “K” each indicating the color of the toner in use in the case of FIG. 1.

The image former 20 includes such a photoconductive drum 40 and a charging roller 18 as described above, a developing device 29, a cleaning blade 13, a static eliminator 19, and a primary transfer roller 62. A charging high-voltage power source 181 is electrically connected to the charging roller 18. A transferring high-voltage power source 621 is electrically connected to the primary transfer roller 62.

The photoconductive drum 40 as an example of the image bearer is a negatively-charged organic photoconductor including a drum-shaped conductive support and a photoconductive layer provided on the drum-shaped conductive support. The photoconductive drum 40 includes a conductive support as a base layer, an undercoat layer as an insulating layer, a charge generation layer and a charge transport layer as photoconductive layers, and a protective layer, that is, a surface layer sequentially stacked in this order. For the conductive support of the photoconductive drum 40, a conductive material or the like having a volume resistance of 1010 Ωcm or less can be used.

The charging roller 18 is a roller member including a conductive cored bar and an elastic layer having medium resistance. An outer periphery of the conductive cored bar is covered with the elastic layer. A predetermined voltage is applied from the charging high-voltage power source 181 to uniformly charge the surface of the photoconductive drum 40 facing the charging roller 18. A cleaning roller that removes dirt from the charging roller 18 may be provided in contact with the charging roller 18.

A minute gap is provided between the charging roller 18 and the photoconductive drum 40. The charging roller 18 is disposed in non-contact with the photoconductive drum 40. The charging type for charging the photoconductive drum 40 in such a state is referred to as a non-contact charging type.

As compared with a contact charging type in which the charging roller 18 and the photoconductive drum 40 are brought into contact with each other to be charged, in the case of the non-contact charging type, foreign matters such as toner and lubricant remaining on the photoconductive drum 40 are less likely to adhere to the charging roller 18. Thus, charging unevenness due to adhesion of the foreign matters can be suppressed. The embodiment, however, is not limited to the non-contact charging type, and thus may be applied to the contact charging type. The charging high-voltage power source 181 applies a charging bias to the charging roller 18.

The developing device 29 includes a developing roller **29*a* facing the photoconductive drum 40. The developing roller 29*a* includes a magnet fixed inside and forming a magnetic pole on a roller peripheral face, and a sleeve that rotates around the magnet. A plurality of magnetic poles is formed on the developing roller 29*a* by the magnet, and developer is carried on the developing roller 29*a***.

The cleaning blade 13 mechanically scrapes off deposits such as untransferred toner adhering to the surface of the photoconductive drum 40. The cleaning blade 13 is a blade-shaped member made of a rubber material such as urethane rubber and has a substantially plate shape. The cleaning blade is in contact with the surface of the photoconductive drum 40 at a predetermined angle and at a predetermined pressure.

The static eliminator 19 removes charges on the surface of the photoconductive drum after a toner image is transferred.

The photoconductive drum 40 uniformly charged by the charging roller 18 is exposed to a light beam from the light beam scanner 21 according to the image data. An electrostatic latent image is formed on the surface of the photoconductive drum 40. The developing device 29 causes toner to adhere to the electrostatic latent image on the surface of the photoconductive drum 40. As a result, a toner image is developed on the surface of the photoconductive drum 40.

Due to application of the voltage generated by the transferring high-voltage power source 621 to the primary transfer roller 62, the toner image on the surface of the photoconductive drum 40 is transferred onto the intermediate transfer belt 10. The toner image on the intermediate transfer belt 10 is transferred to the sheet P by the secondary transfer unit 22, and then fixed to the sheet P by the fixing unit 25. Residual toner or the like on the surface of the photoconductive drum 40 are removed by the cleaning blade 13. The charges on the surface of the photoconductive drum 40 are removed by the static eliminator 19.

Hardware Configuration Example of Image Forming Apparatus 100

Figure 3:
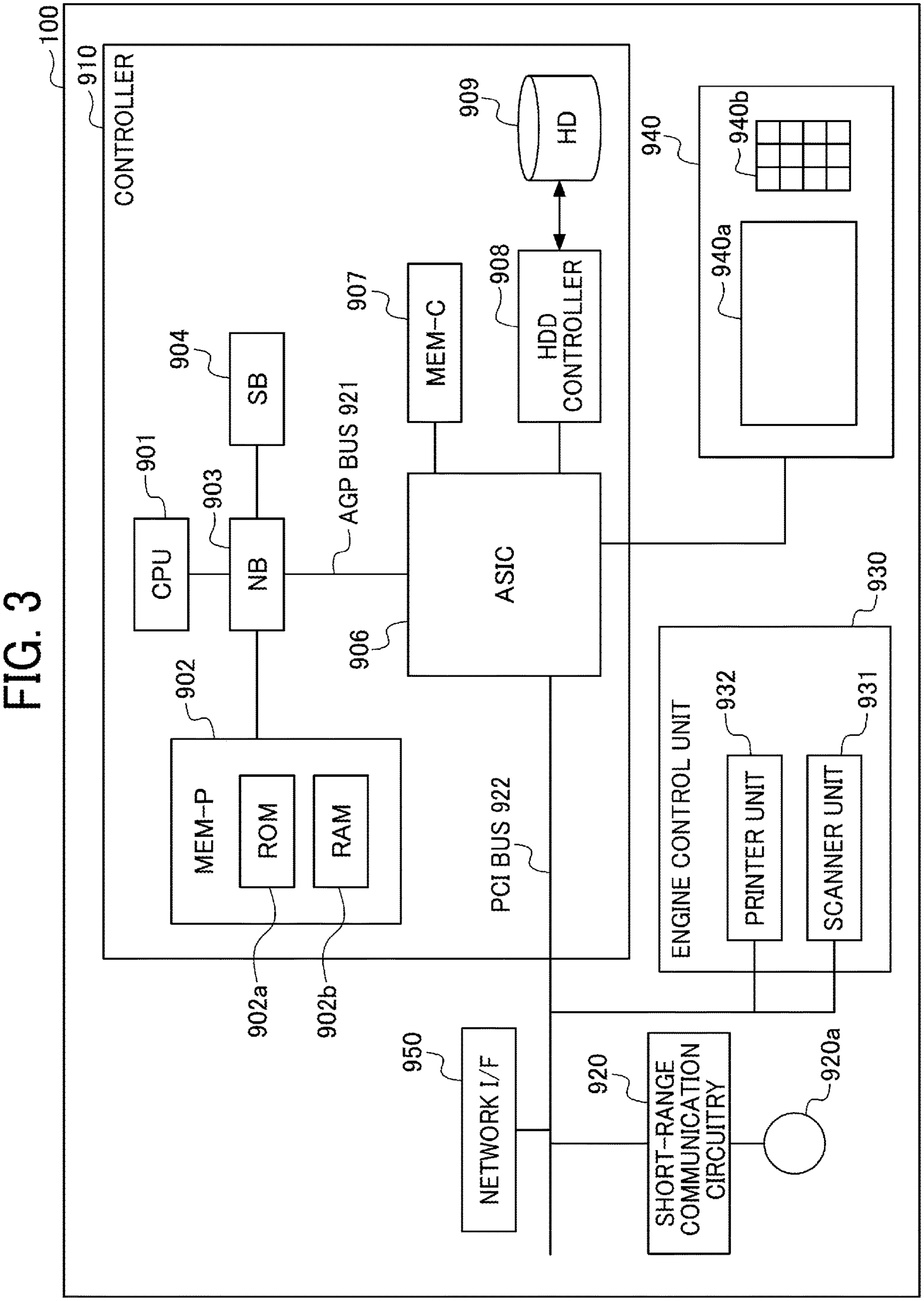
FIG. 3 is a block diagram illustrating a hardware configuration of the image forming apparatus.

The hardware configuration of the image forming apparatus 100 will now be described. FIG. 3 is a block diagram illustrating an example of the hardware configuration of the image forming apparatus 100.

As illustrated in FIG. 3, the image forming apparatus 100 includes a controller 910, a short-range communication circuitry 920, an engine control unit 930, an operation panel 940, a network interface (I/F) 950, and a control board.

The controller 910 includes a central processing unit (CPU) 901 as a main part of a computer, a system memory (MEM-P) 902, a north bridge (NB) 903, a south bridge (SB) 904, an application specific integrated circuit (ASIC) 906, a local memory (MEM-C) 907 as a storage, a hard drive disk (HDD) controller 908, and a hard drive (HD) 909 as a storage. The NB 903 and the ASIC 906 are connected through an accelerated graphics port (AGP) bus 921.

The CPU 901 is a control unit that performs overall control of the image forming apparatus 100. The NB 903 is a bridge for connecting the CPU 901, the MEM-P902, the SB 904, and the AGP bus 921, and includes a memory controller that controls reading and writing from and to the MEM-P902, a peripheral component interconnect (PCI) master, and an AGP target.

The MEM-P902 includes a read only memory (ROM) 902*a* as a memory for storing programs and data for achievement of each function of the controller 910, and a random-access memory (RAM) 902*b* that is used for developing the program and the data and used as a drawing memory at the time of memory printing.

Note that the programs stored in the RAM 902*b* may be provided by being recorded in a computer-readable recording medium such as a compact disc-read only memory (CD-ROM), a compact disc-readable (CD-R), or a digital versatile disc (DVD), as a file in an installable format or an executable format.

The SB 904 is a bridge for connecting the NB 903 to a PCI device and a peripheral device. The ASIC 906 is an integrated circuit (IC) for image processing having a hardware element for image processing, and has a role as a bridge that connects the AGP bus 921, the PCI bus 922, the HDD 908, and the MEM-C907.

The ASIC 906 includes a PCI target, an AGP master, an arbiter (ARB) as the core of the ASIC 906, a memory controller that controls the MEM-C907, a plurality of direct memory access controllers (DMACs) that rotates image data by hardware logic or the like, and a PCI unit that performs data transfer between a scanner unit 931 and a printer unit 932 through the PCI bus 922.

A USB interface or an Institute of Electrical and Electronics Engineers 1394 (IEEE 1394) interface may be connected to the ASIC 906.

The MEM-C907 is a local memory used as a copy image buffer and a code buffer. The HD 909 is a storage for accumulating image data, font data used at the time of printing, and forms. The HD 909 controls data reading from or data writing to the HD 909 under the control of the CPU 901.

The AGP bus 921 is a bus interface for a graphics accelerator card proposed for speeding up graphics processing, and allows the graphics accelerator card to speed up due to directly access to the MEM-P902 with high throughput.

The short-range communication circuitry 920 includes a short-range communication circuit 920*a*. The short-range communication circuitry 920 is a communication circuit such as near field communication (NFC) or Bluetooth (Registered Trademark).

The engine control unit 930 includes the scanner unit 931 and the printer unit 932. The image former 20 described with reference to FIG. 2 is included in the printer unit 932.

The operation panel 940 includes a panel display 940*a* such as a touch panel that displays a current setting value, a selection screen, and others and receives an input from an operator; and an operation panel 940*b* including a numeric keypad that receives a setting value of a condition related to image formation such as a density setting condition, a start key that receives an instruction for starting copy.

The controller 910 controls the entire image forming apparatus 100 and controls, for example, drawing, communication, and an input from the operation panel 940. The scanner unit 931 or the printer unit 932 includes an image processing portion such as error diffusion or gamma conversion.

The image forming apparatus 100 can sequentially switch and select a document box function, a copy function, a printer function, and a facsimile function through an application switching key of the operation panel 940.

A document box mode is set at the selection of the document box function. A copy mode is set at the selection of the copy function. A printer mode is set at the selection of the printer function. A facsimile mode is set at the selection of the facsimile mode.

The network I/F 950 is an interface for data communication using a network. The short-range communication circuitry 920 and the network I/F 950 are electrically connected to the ASIC 906 through the PCI bus 922.

Overview of Phase Alignment Control

As illustrated in FIG. 1, the tandem-color image forming apparatus 100 including the plurality of photoconductive drums 40 (40Y, 40M, 40C, and 40K) as image bearers may cause cyclic image density unevenness occurring in the photoconductor circumferential length due to eccentricity of the photoconductive drums 40. Therefore, in order to suitably reduce the image density unevenness, the image forming apparatus 100 of the present embodiment performs "phase alignment control" for synchronizing the density phase unevenness of each color.

Figure 4:
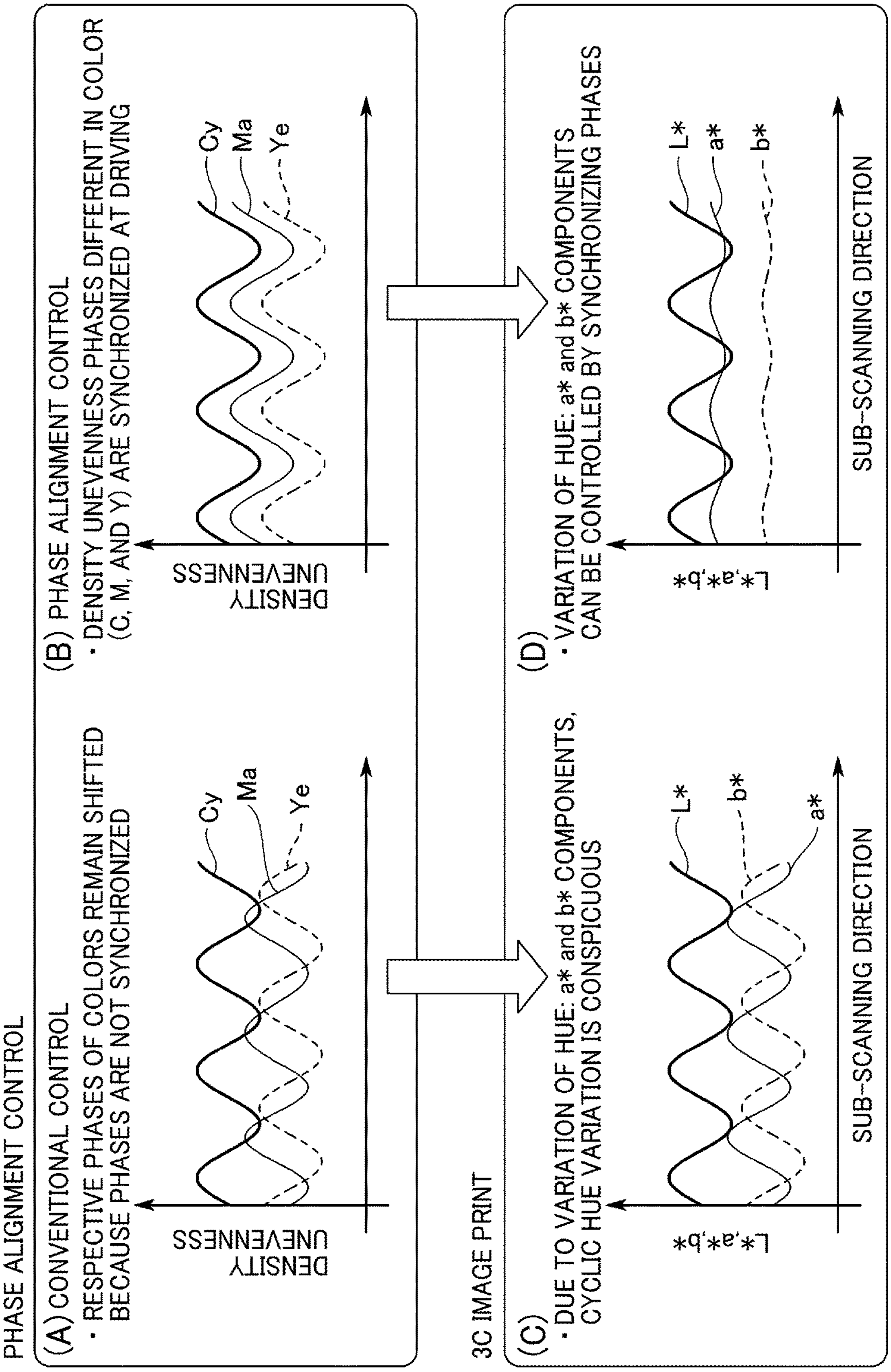
FIG. 4 is a diagram illustrating the overview of phase alignment control.

FIG. 4 is a diagram illustrating the overview of phase alignment control. Part (A) of FIG. 4 indicates the overview of phase alignment control according to a comparative example. Part (B) of FIG. 4 indicates the overview of phase alignment control according to the present embodiment. Part (C) of FIG. 4 indicates an example of a print result of an image generated by the phase alignment control according to the comparative example. Part (D) of FIG. 4 indicates an example of a print result of an image generated by the phase alignment control according to the present embodiment. In this technique of the present embodiment, it is effective to synchronize the phases of the density unevenness in Y, M, C, K, and S colors. However, in FIG. 4, three colors of Y, M, and C are indicated as an example.

In each of parts (A) and (B) of FIG. 4, the horizontal axis represents time, and the vertical axis represents the density unevenness of the photoconductive drums 40Y, 40M, and 40C different in color. In each of parts (C) and (D) of FIG. 4, the horizontal axis represents the sub-scanning direction, and the vertical axis represents the lightness L*, the chromaticity a*, and the chromaticity b* of a print image.

As indicated in part (A) of FIG. 4, when the photoconductors different in color are independently driven for variation in the amount of toner adhesion (density unevenness) occurring in the photoconductor cycle, the respective phases of the colors remain shifted because the phases are not synchronized. As a result, as indicated in part (C) of FIG. 4, when an overlapped image of two or more colors is formed, density unevenness is emphasized and a large density variation may occur. In the example of part (C) of FIG. 4, due to variation of the hue components a* and b*, the cyclic hue variation is conspicuous.

On the other hand, in the present embodiment, as indicated in part (B) of FIG. 4, phase alignment control is performed in which the photoconductive drums 40 different in color are driven such that the photoconductor density unevenness phases different in color coincide with each other on the image. As indicated in part (D) of FIG. 4, the lightness and chromaticity of the generated image are also synchronized by the phase alignment control and the hue components a* and b* can be suppressed. As a result, the density unevenness (4E) in the sub-scanning direction by the rotators can be suppressed.

Figure 5:
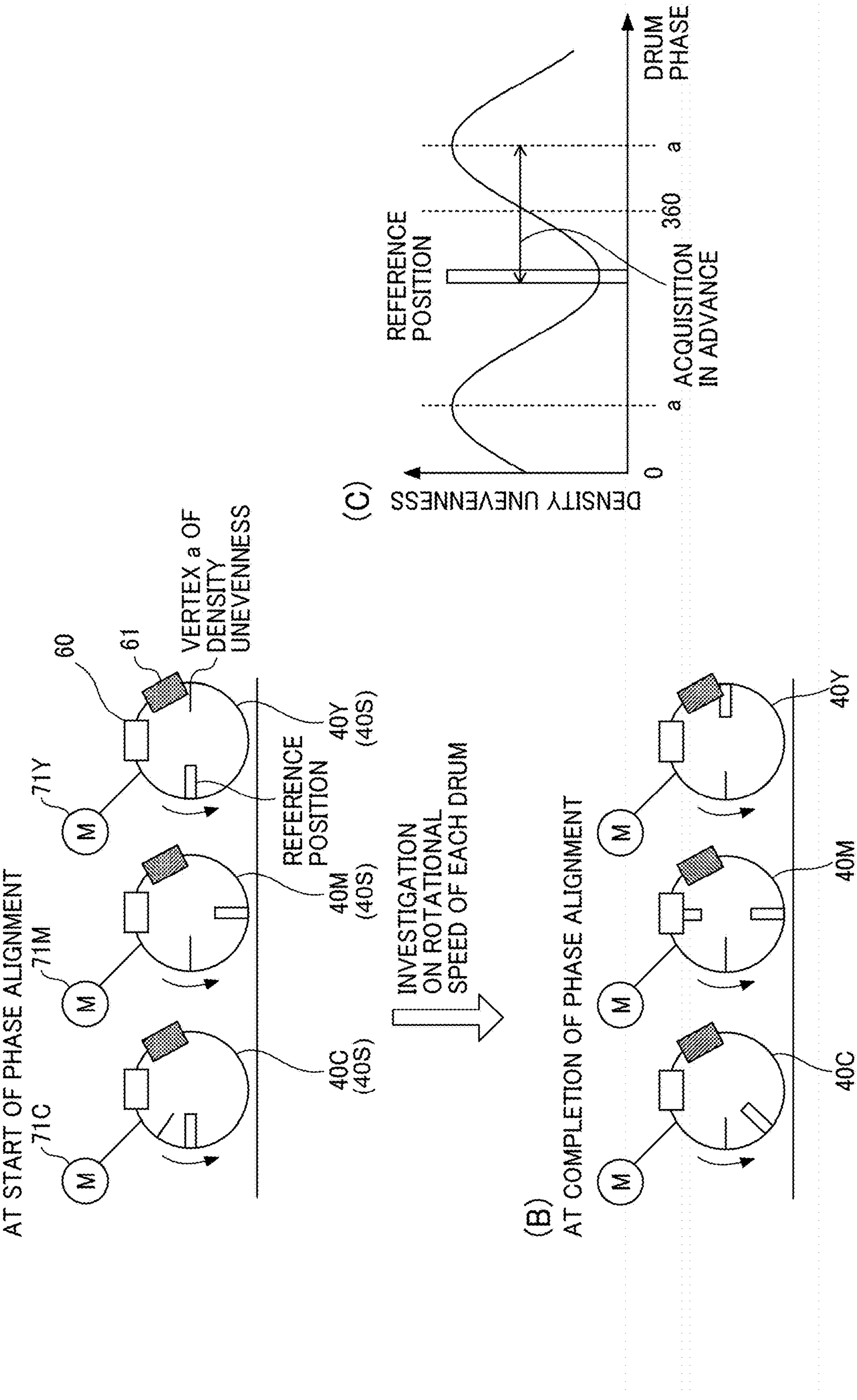
FIG. 5 is an illustration of phase alignment control according to an embodiment of the present disclosure.

FIG. 5 is an illustration of phase alignment control according to an embodiment of the present disclosure. Part (A) of FIG. 5 illustrates the phases of the photoconductive drums 40C, 40M, and 40Y different in color at the start of the phase alignment control. Part (B) of FIG. 5 illustrates the phases of the photoconductive drums 40C, 40M, and 40Y different in color at the completion of the phase alignment control. Part (C) of FIG. 5 is a graph indicating an example of the relationship between the phase of each drum and the density unevenness, where the horizontal axis represents the drum phase and the vertical axis represents the density unevenness. In part (C) of FIG. 5, the phase at which the density unevenness is maximized is also indicated with reference sign a. In part (C) of FIG. 5, a predetermined reference position of the drum phase is also indicated. In parts (A) and (B) of FIG. 5, the vertex of the density unevenness of each of the photoconductive drums 40C, 40M, and 40Y different in color, that is, the position of the phase a at which the density unevenness indicated in part (C) of FIG. 5 is maximized, and the reference position are illustrated along the circumferential direction of the circular shape of each drum.

As illustrated in part (A) of FIG. 5, at the start of the phase alignment control, the position of the vertex of the density unevenness with respect to the reference position varies in each of the photoconductive drums 40C, 40M, and 40Y. The phase at the position of the vertex of the density unevenness of each of the photoconductive drums 40C, 40M, and 40Y also varies.

In the phase alignment control, before each of the photoconductive drums 40C, 40M, and 40Y comes into contact with the intermediate transfer belt, the respective rotational speeds of the photoconductive drums 40C, 40M, and 40Y are adjusted such that the phases that become the vertexes of the density unevenness of the photoconductive drums 40C, 40M, and 40Y coincide with each other on the print image.

The relationship of the density unevenness to the drum phase of each of the drums 40C, 40M, and 40Y (density unevenness phase) can be acquired in advance by another adjustment operation. In FIG. 5, exemplified is the case where a reference position detector 60 such as a home position sensor is used as a phase detector of each photoconductive drum and a rotary encoder is used as a speed detector 61.

As illustrated in part (B) of FIG. 5, at the completion of the phase alignment control, the phases as the vertexes of the density unevenness of the photoconductive drums 40C, 40M, and 40Y are aligned identically.

Specific Configuration of Phase Alignment Control

Figure 6:
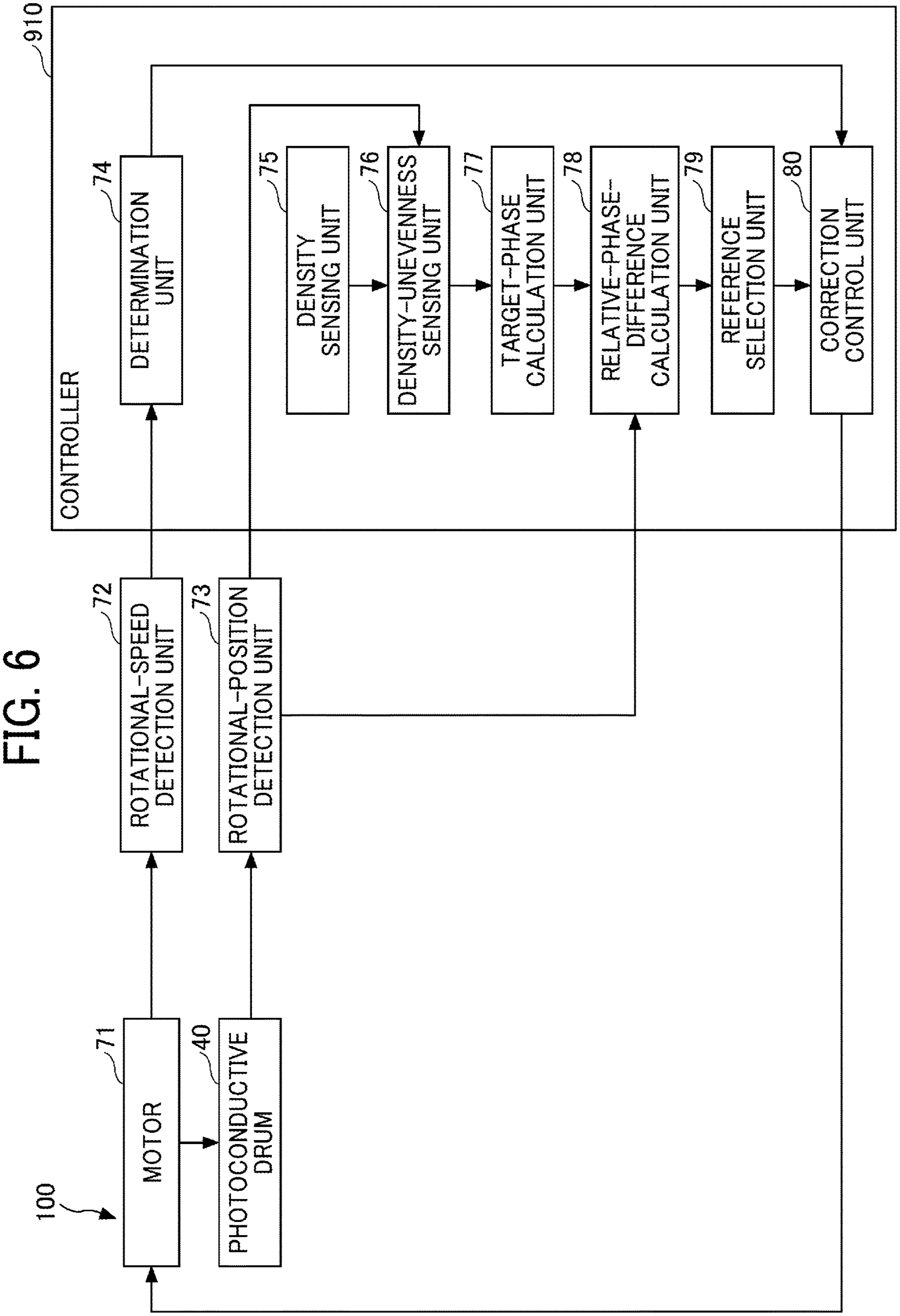
FIG. 6 is a functional block diagram of the image forming apparatus related to the phase alignment control.

FIG. 6 is a functional block diagram of the image forming apparatus 100 related to phase alignment control.

The image forming apparatus 100 further includes a motor 71, a rotational-speed detection unit 72, and a rotational-position detection unit 73 in addition to the photoconductive drums 40. The controller 910 further includes a determination unit 74, a density sensing unit 75, a density-unevenness sensing unit 76, a target-phase calculation unit 77, a relative-phase-difference calculation unit 78, a reference selection unit 79, and a correction control unit 80 as functions related to the phase alignment control.

The motor 71 drives rotationally each of the plurality of photoconductive drums 40. Specifically, the motor 71 includes a plurality of motors for each driving the corresponding photoconductive drum 40Y, 40M, 40C, or 40K, and is also referred to as the plurality of motors 71Y, 71M, 71C, and 71K. FIGS. 5A and 5B illustrate the motors 71C, 71M, and 71Y corresponding to the photoconductive drums 40C, 40M, and 40Y, respectively.

The rotational-speed detection unit 72 detects the rotational speeds of the plurality of motors 71. More specifically, the rotational-speed detection unit 72 includes a plurality of rotational speed detection units for each detecting the corresponding motor 71Y, 71M, 71C, or 71K, and is also referred to as the plurality of rotational speed detection units 72Y, 72M, 72C, and 72K. As the rotational-speed detection unit 72, like the speed detector 61 exemplified in FIGS. 5A and 5B, an element such as a rotary encoder is applicable. The rotational-speed detection unit 72 outputs information on the detected rotational speed of each motor 71 to determination unit 74.

The rotational-position detection unit 73 detects the respective rotational positions (θy, θm, and θc indicated in FIGS. 10A, 10B, and 10C and FIG. 11) of the plurality of photoconductive drums 40. The rotational-position detection unit 73 includes a plurality of rotational-position detection units for each detecting the rotational position of the corresponding photoconductive drum 40Y, 40M, 40C, or 40K, and is also referred to as the plurality of rotational-position detection units 73Y, 73M, 73C, and 73K. As the rotational-position detection unit 73, for example, like the reference position detector 60 illustrated in FIGS. 5A and 5B, an element such as a home position sensor is applicable. The rotational-position detection unit 73 outputs information on the detected rotational position of each photoconductive drum 40 to the density-unevenness sensing unit 76 and the relative-phase-difference calculation unit 78.

The determination unit 74 determines whether the rotational speeds of the plurality of photoconductive drums 40Y, 40M, 40C, and 40K have fallen with a target speed range. For example, with the information on the rotational speed of each motor 71 detected by the rotational-speed detection unit 72, the determination unit 74 can calculate the rotational speed of the corresponding photoconductive drum 40 to perform determination. The rotational-speed detection unit 72 may directly measure the rotational speed of each photoconductive drum 40, and the determination unit 74 may perform determination with the rotational speed of the corresponding photoconductive drum 40 measured directly by the rotational-speed detection unit 72. The determination unit 74 outputs the determination result to the correction control unit 80.

The density sensing unit 75 senses the density of a toner image formed on each of the plurality of photoconductive drums 40Y, 40M, 40C, and 40K. The density sensing unit 75 outputs information on the detected density of the toner image to the density-unevenness sensing unit 76.

With the detection result from the rotational-position detection unit 73 and the sensing result from the density sensing unit 75, the density-unevenness sensing unit 76 forms a predetermined image pattern, and senses the density unevenness phase on the basis of the density unevenness in the rotation cycle (or rotator cycle) of the corresponding photoconductive drum 40Y, 40M, 40C, or 40K and the rotational position reference. For example, the density-unevenness sensing unit 76 calculates such a cyclic density unevenness of each photoconductive drum 40 as indicated in parts (A) and (B) of FIG. 4, for example, on the basis of density information on the toner image detected by the density sensing unit 75. The density-unevenness sensing unit 76 derives such a reference position of each photoconductive drum 40 as illustrated in FIGS. 5A and 5B as the rotational position reference of the photoconductive drum 40, for example, on the basis of the information on the rotational position of the photoconductive drum 40 detected by the rotational-position detection unit 73. Then, the density unevenness phase is derived from such a relationship between the cyclic density unevenness and the rotational position reference as exemplified in part (C) of FIG. 5. The density-unevenness sensing unit 76 outputs information on the detected density unevenness phase to the target-phase calculation unit 77.

Figure 10A:
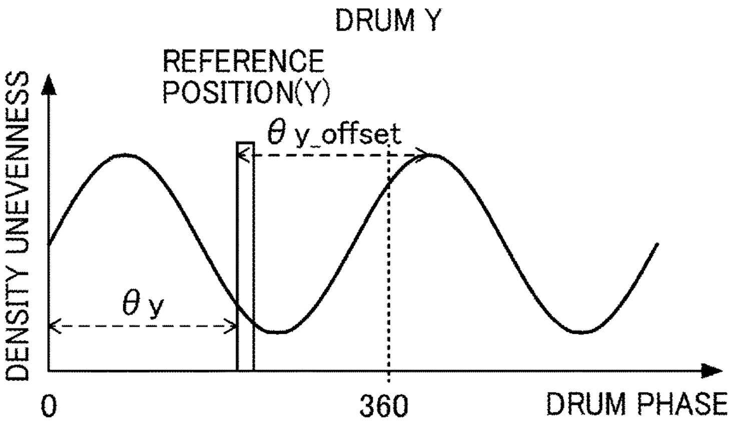
FIGS. 10A, 10B, and 10C are explanatory graphs indicating parameters in use for phase correction in the present embodiment.
Figure 10B:
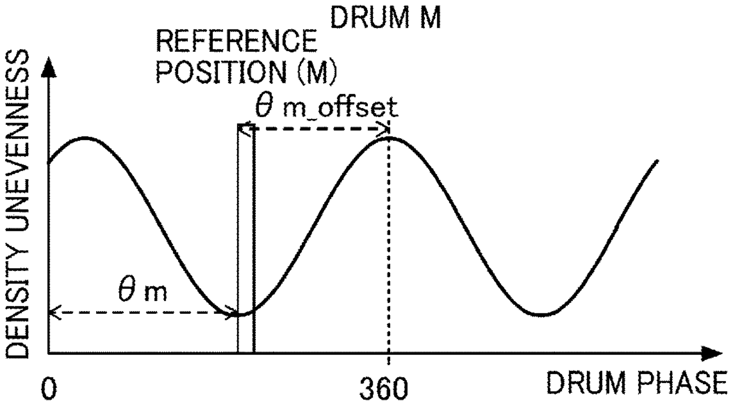
Figure 10C:
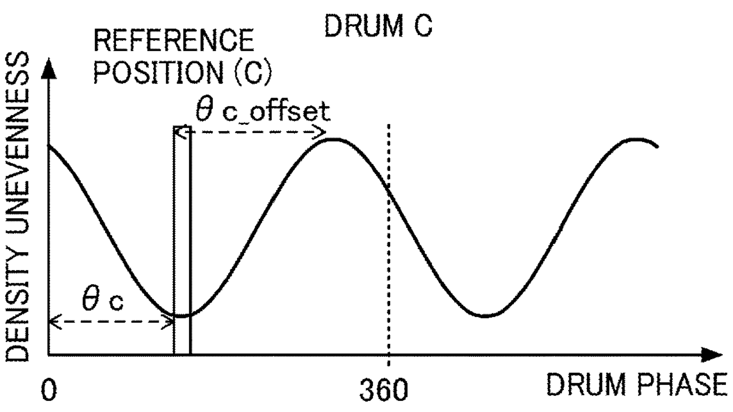

The target-phase calculation unit 77 calculates the target phase of each of the plurality of photoconductive drums 40Y, 40M, 40C, and 40K ($\theta$y_offset, $\theta$m_offset, and $\theta$c_offset illustrated, for example, in FIGS. 10A, 10B, and 10C), on the basis of the information on the density unevenness phase acquired by the density-unevenness sensing unit 76. The target-phase calculation unit 77 outputs information on the calculated target phase of each photoconductive drum 40 to the relative-phase-difference calculation unit 78.

The relative-phase-difference calculation unit 78 calculates a relative phase difference (eYM, eYC, eMY, eMC, eCY, or eCM illustrated in FIG. 11) of each of the plurality of photoconductive drums 40Y, 40M, 40C, and 40K, on the basis of the rotational positions of the plurality of photoconductive drums 40Y, 40M, 40C, and 40K acquired by the rotational-position detection unit 73 and the target phases calculated by the target-phase calculation unit 77. The relative-phase-difference calculation unit 78 outputs information on the calculated relative phase difference of each photoconductive drum 40 to the reference selection unit 79.

Figure 11:
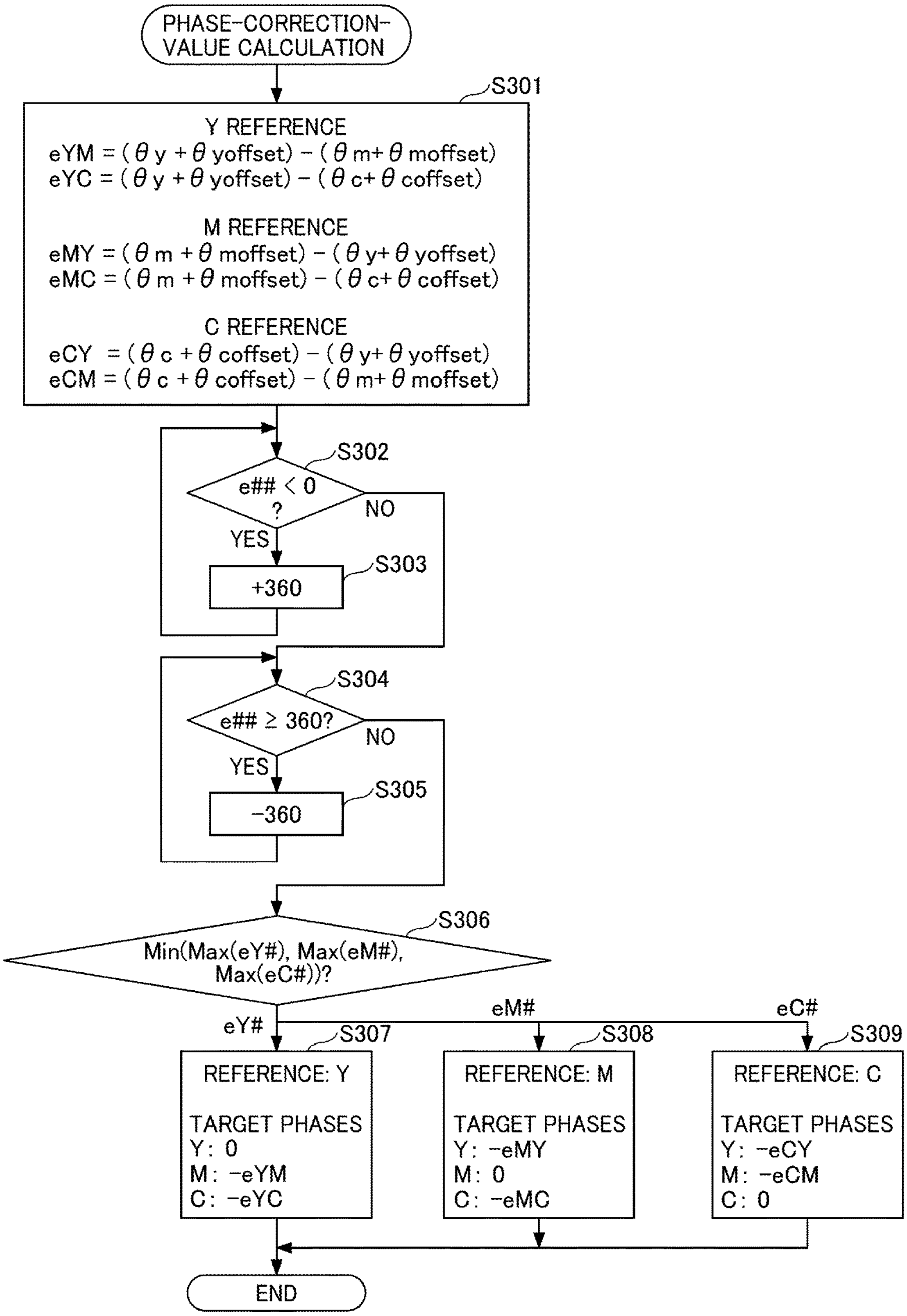
FIG. 11 is a flowchart of phase-correction-value calculation processing.

The reference selection unit 79 selects, as a reference drum 40S as a reference image bearer, the conductive drum having the minimum phase correction value (Max(eY #), Max(eM #), or Max(eC #) illustrated in FIG. 11), on the basis of the calculation result from the relative-phase-difference calculation unit 78, from among the plurality of photoconductive drums 40Y, 40M, 40C, and 40K. The reference selection unit 79 outputs information on the selected reference drum 40S to the correction control unit 80.

With the plurality of motors 71Y, 71M, 71C, and 71K being driven, the correction control unit 80 controls the rotational position of each of the photoconductive drums other than the reference drum 40S among the plurality of photoconductive drums 40Y, 40M, 40C, and 40K to the phase correction value obtained by the reference selection unit 79 with respect to the reference drum 40S obtained by the reference selection unit 79. For example, the correction control unit 80 can output a control command to each of the motors 71Y, 71M, 71C, and 71K to correct the rotational positions of the photoconductive drums 40Y, 40M, 40C, and 40K driven one-to-one by the motors.

In FIGS. 5A and 5B, the photoconductive drum 40M is selected as the reference drum 40S, and the rotational positions of the other photoconductive drums 40C and 40Y are corrected such that the density unevenness phases are aligned with the density unevenness phase of the reference drum 40S.

For example, on the basis of the determination result from the determination unit 74, when the rotational speed of each of the plurality of photoconductive drums 40Y, 40M, 40C, and 40K has fallen with a target speed rage, the correction control unit 80 can determine that the corresponding motor 71Y, 71M, 71C, or 71K has been driven. In a case where the drive state of each motor is determined in such a manner, the correction control unit 80 corrects the rotational position of the corresponding drum described above.

Figure 7:
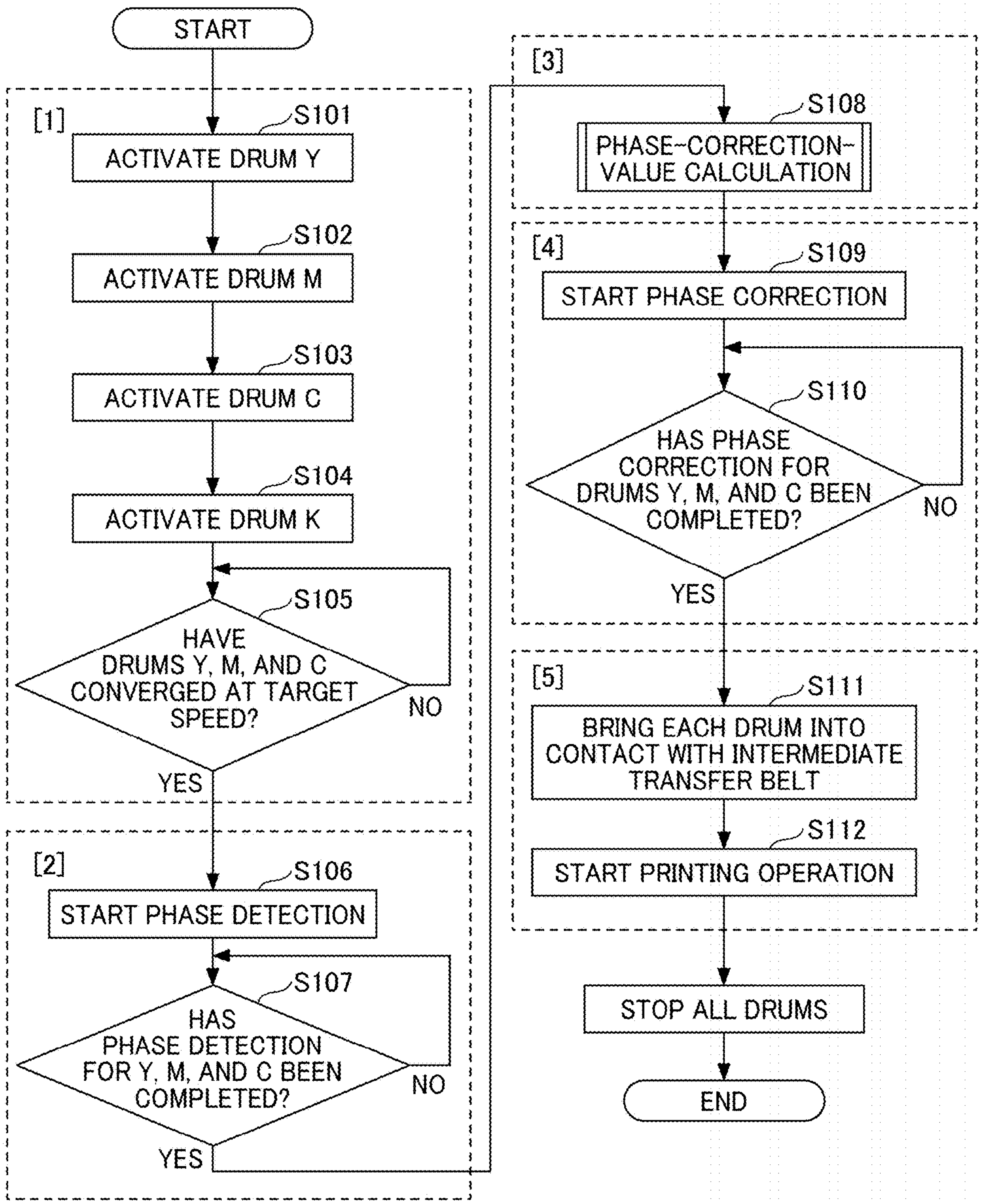
FIG. 7 is a flowchart of the phase alignment control.

FIG. 7 is a flowchart of the phase alignment control. In FIG. 7, the case where printing is performed for four colors of Y, M, C, and K, and phase alignment is performed on the drums of Y, M, and C (photoconductive drums 40Y, 40M, and 40C) will be described as an example (hereinafter, similarly, the example applies to the case where there is no particular description). In the present embodiment, Y, M, and C that most affect the image quality will be described as an example. The technique of phase alignment control of the present embodiment is applicable to a case of K color and a case of five or more colors.

First, in steps S101 to S104, each of the photoconductive drums 40Y, 40M, 40C, and 40K is activated by the controller 910. In step S105, the determination unit 74 determines whether or not the photoconductive drums 40Y, 40M, and 40C to be subjected to phase alignment have converged at a target speed. In a state where the speeds have not converged at the target speed (No in step S105), the processing stands by.

If the determination unit 74 confirms the convergence (Yes in step S105), it is determined that the motor 71 for driving rotationally the photoconductive drums 40Y, 40M, and 40C has been driven, and the processing of step S106 and subsequent steps of the phase alignment control start.

In step S106, the rotational-position detection unit 73 starts phase detection for the photoconductive drums 40Y, 40M, and 40C. In a state where the phase detection has not been completed (No in step S107), the processing stands by.

If the phase detection for the photoconductive drums 40Y, 40M, and 40C has been completed (Yes in step S107), a phase correction value is calculated in step S108. Details of the processing in step S108 will be described later with reference to FIG. 11. In step S109, the correction control unit 80 starts phase correction. In a state where the phase correction is not completed (No in step S110), the processing stands by.

Here, in step S108, when controlling the rotational position of each of the photoconductive drums 40 to the phase correction value, the correction control unit 80 may decelerate the photoconductive drums 40 other than the reference drum 40S so that the rotational position of each of the photoconductive drums 40 matches the phase correction value. Alternatively, when controlling the rotational position of each of the photoconductive drums 40 to the phase correction value, the correction control unit 80 may accelerate the photoconductive drums 40 other than the reference drum 40S so that the rotational position of each of the photoconductive drums 40 matches the phase correction value. Selection of the deceleration or the acceleration can be appropriately made according to the operation condition of the motor 71 or the photoconductive drums 40 at the time of execution of the phase alignment control. As a result, more appropriate phase alignment control according to the operation environment can be performed.

If phase correction for each of the photoconductive drums 40Y, 40M, and 40C has been completed (Yes in step S110, the phase alignment is completed. In step S111, each drum 40 is brought into contact with the intermediate transfer belt (intermediate transfer belt 10) by the controller 910, and the processing proceeds to printing operation in step S112.

The number of colors to be printed may be other than the colors described in this flow as long as the number is two or more, and the activation order of the photoconductive drums 40 may not be the order described in this flow.

The description of drive control of components other than the photoconductive drums is not given.

In the flowchart of FIG. 7, the case is exemplified in which, if the determination unit 74 confirms that the rotational speeds of the photoconductive drums 40Y, 40M, and 40C to be subjected to phase alignment have converged at the target speed in step S105, it is determined that the motor 71 for driving rotationally the photoconductive drums 40Y, 40M, and 40C has been driven and the processing of step S106 and the subsequent steps of the phase alignment control start. However, in the present embodiment, it is sufficient that the alignment control can be performed after the motor 71 that drives rotationally the photoconductive drums 40Y, 40M, and 40C has been driven, and the drive state of the motor 71 may be determined by a technique other than the determination unit 74.

Figure 8:
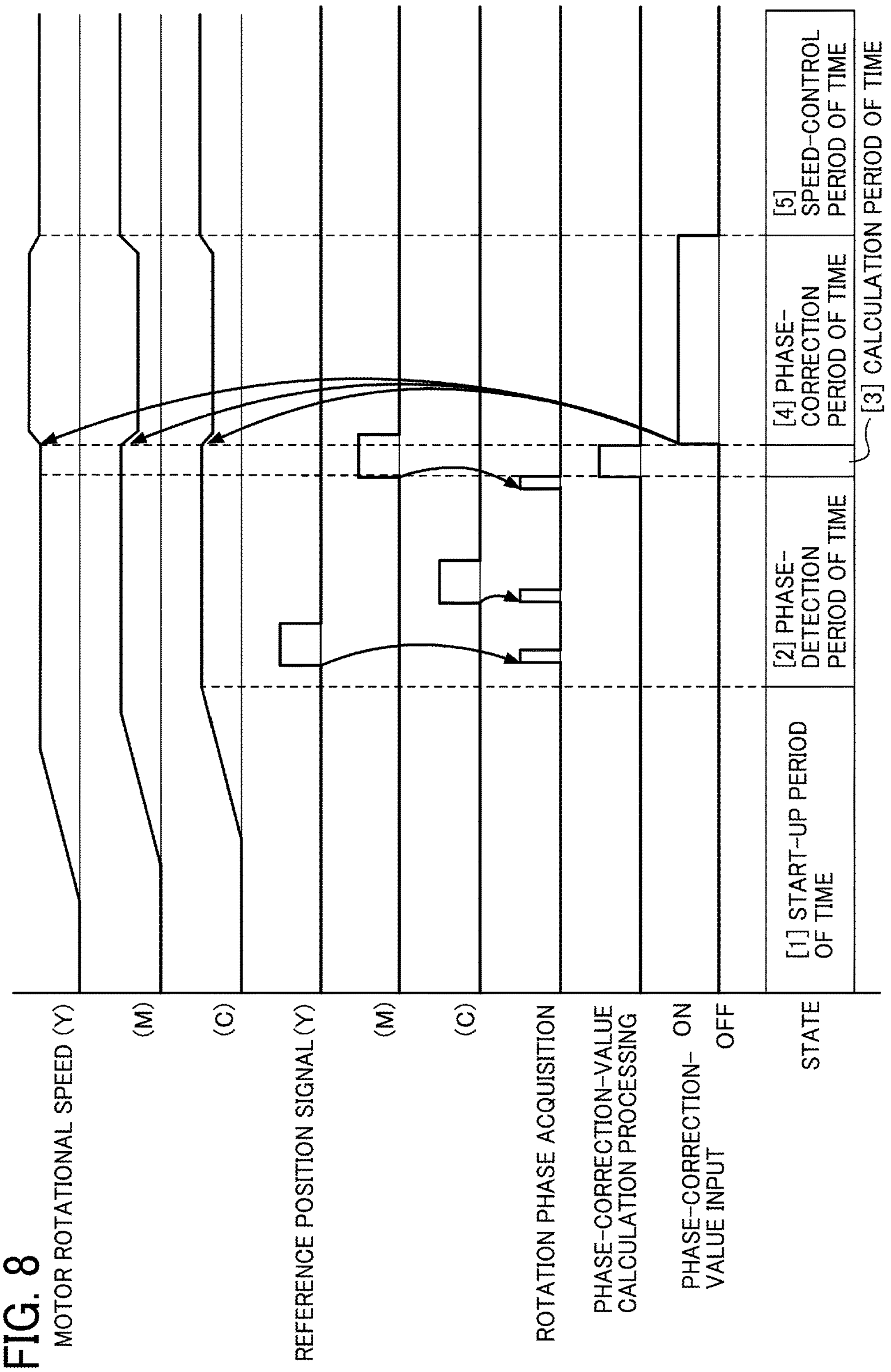
FIG. 8 is a timing chart of various signals in the phase alignment control illustrated in FIG. 7.

FIG. 8 is a timing chart of various signals in the phase alignment control illustrated in FIG. 7. FIG. 8 exemplifies temporal transitions of the motor rotational speeds (Y), (M), and (C) of the photoconductive drums 40Y, 40M, and 40C; reference position signals (Y), (M), and (C); a rotation-phase acquisition signal; a phase-correction-value calculation processing signal; and a phase-correction-value input signal. The lowermost part of FIG. 8 indicates states [1] to [5] of the photoconductive drums 40Y, 40M, and 40C corresponding to the time axes of the signals.

After activation, each of the photoconductive drums 40Y, 40M, and 40C sequentially transitions through the start-up period of time [1], the phase-detection period of time [2], the calculation period of time [3], the phase-correction period of time [4], and the speed-control period of time [5]. As also illustrated in FIG. 7, the start-up period of time [1] corresponds to steps S101 to S105 in FIG. 7, the phase-detection period of time [2] corresponds to steps S106 to S107, the calculation period of time [3] corresponds to step S108, the phase-correction period of time [4] corresponds to steps S109 to S110, and the speed-control period of time [5] corresponds to steps S111 to S112.

As indicated in FIG. 8, in the start-up period of time [1], the motors 71Y, 71M, and 71C for the drums to be subjected to the phase alignment control are started up (=converged at the same target speed). For example, in a case where the rotational speeds have fallen in the range of ±3% of the target speed continuously for 50 milliseconds, it can be determined that the rotational speeds have converged at the target speed. In the example of FIG. 8, the rotational speeds (Y), (M), and (C) of the motors 71Y, 71M, and 71C are started up in this order, and transition is made to the phase-detection period of time [2] at the timing when the motor rotational speeds (Y), (M), and (C) have each reached the target speed.

In the phase-detection period of time [2], each rotation phase is acquired at the start-up edges of the reference position signals (Y), (M), and (C) of the photoconductive drums 40Y, 40M, and 40C. In the example of FIG. 8, the reference position signals (Y), (C), and (M) are detected in the order of the photoconductive drum 40Y, the photoconductive drum 40C, and the photoconductive drum 40M. Each rotation phase signal is acquired at the timing of rising of the corresponding reference position signal. A transition is made to the calculation period of time [3] at the timing when all the rotation phase signals are acquired.

In the calculation period of time [3], a phase-correction-value calculation processing signal rises, and a phase correction value is calculated on the basis of the relationship between the rotation phase difference and the density unevenness phase of each of the photoconductive drums 40Y, 40M, and 40C. A transition is made to the phase-correction period of time [4] at timing of completion of the calculation of the phase correction value.

In the phase-correction period of time [4], each phase correction value calculated in the calculation period of time [3] is input to the corresponding the motor 71Y, 71M, or 71C to adjust the rotation phase of the corresponding photoconductive drum 40Y, 40M, or 40C. In the example of FIG. 8, the phase-correction-value input signal is switched to the ON state, and the rotational speeds (Y), (M), and (C) of the motors 71Y, 71M, and 71C are adjusted according to the switching, so that the rotation phases of the photoconductive drums 40Y, 40M, and 40C are corrected. When the correction of the rotational phase of each conductive drum is completed, the motor rotational speeds (Y), (M), and (C) are returned to the target speed, and a transition is made to the speed-control period of time [5].

In the speed-control period of time [5], the speeds of the motors 71Y, 71M, and 71C are controlled at a steady speed. Because the rotational speed of each motor 71 is changed during the phase-correction period of time [4], the corresponding photoconductive drum 40 and the intermediate transfer belt 10 are brought into contact with each other from the speed-control period of time [5] after the rotational speed is stabilized. For example, in a case where the rotational speed has fallen in the range of ±3% of the target speed continuously for 50 milliseconds, it can be determined that the rotational speed is stabilized.

Figure 9:
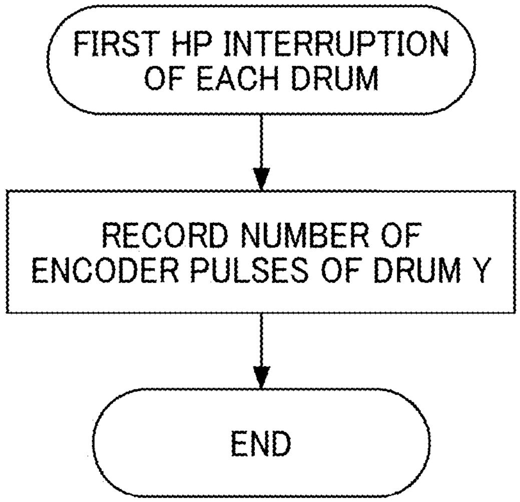
FIG. 9 is a flowchart of phase acquisition processing of each drum in a phase-detection period of time.

FIG. 9 is a flowchart of the phase acquisition processing of each drum in the phase-detection period of time.

In the phase-detection period of time [2] in FIG. 8, the number of encoder pulses (angle) of one drum is recorded in the first home position (HP) interruption of each of the photoconductive drums 40Y, 40M, and 40C, and the rotation phase difference of each drum is grasped. In FIG. 9, as an example, the number of encoder pulses (angle) of the drum Y (photoconductive drum 40Y) is recorded; however, a drum different in color may be used.

FIGS. 10A, 10B, and 10C are explanatory graphs indicating parameters in use for the phase correction in the present embodiment. FIGS. 10A, 10B, and 10C are graphs of the density unevenness of the drums Y, M, and C (photoconductive drums 40Y, 40M, and 40C), respectively. The horizontal axis of each graph represents the drum phase, and the vertical axis represents the density unevenness.

In the present embodiment, as indicated in FIGS. 10A, 10B, and 10C, the respective phases in the phase-detection period of time [2] of the photoconductive drums 40Y, 40M, and 40C are stored as θy, θm, and θc, and the target phases resulting from the density-unevenness-phase calculation result (acquired in advance) are set as θy_offset, θm_offset, and θc_offset. As indicated in FIGS. 10A, 10B, and 10C, the angles θy, θm, and θc can also be expressed as rotational angles from the positions at the start of the phase-detection period of time to the reference positions (Y), (M), and (C) of the photoconductive drums 40Y, 40M, and 40C, respectively. The target phases θy_offset, θm_offset, and θc_offset can also be expressed as differences between the positions at which the density unevenness of the photoconductive drums 40Y, 40M, and 40C are maximized and the reference positions (Y), (M), and (C).

FIG. 11 is a flowchart of the phase-correction-value calculation processing. The flowchart illustrated in FIG. 11 corresponds to step S108 of the phase alignment control illustrated in FIG. 7, and is a subroutine process of step S108. The processing of the flowchart illustrated in FIG. 11 is performed in the calculation period of time [3] indicated in FIG. 8.

The processing of the flow in FIG. 11 is performed in the calculation period of time [3] indicated in FIG. 8. The reference color for phase alignment is selected, and then calculation is performed so as to minimize the amount of target phase correction. If the amount of target phase correction can be minimized, the time for the phase alignment is shortened, and thus the drawbacks can be solved.

The flow in FIG. 11 will be described with an exemplified case where the parameters indicated in FIGS. 10A, 10B, and 10C are θy=200, θm=200, θc=90, θy_offset=200, θm_offset=180, and θc_offset=180.

For the target phases θy_offset, θm_offset, and θc_offset, the density of the toner image on each photoconductive drum 40 is sensed by the density sensing unit 75 at the previous stage of the flowchart in FIG. 11. Next, with the detection result from the rotational-position detection unit 73 and the sensing result from the density sensing unit 75, the density-unevenness sensing unit 76 senses the density unevenness phase on the basis of the density unevenness in the rotation cycle (or rotator cycle) of the corresponding photoconductive drum and the rotational position reference as in the graphs indicated in FIGS. 10A, 10B, and 10C, for example. The target-phase calculation unit 77 calculates the target phases θy_offset, θm_offset, and θc_offset of the photoconductive drums 40 on the basis of the density unevenness phases acquired by the density-unevenness sensing unit 76. The phases θy, θm, and θc of the photoconductive drums 40 are detected in advance by the rotational-position detection unit 73 in steps S106 and S107 of FIG. 7.

In step S301, the relative-phase-difference calculation unit 78 calculates respective relative phase angles on the basis of Y reference, M reference, and C reference. The relative-phase-difference calculation unit 78 obtains each relative phase angle starting from the corresponding photoconductive drum 40Y, 40M, or 40C.

In the case of the Y reference starting from the photoconductive drum 40Y, the relative phase difference eYM of the photoconductive drum 40M and the relative phase difference eYC of the photoconductive drum 40C can be calculated, respectively, by Expressions (1) and (2) below.

$$eYM=(\theta y+\theta y\_\text{offset})-(\theta m+\theta m\_\text{offset}) \quad (1)$$

$$eYC=(\theta y+\theta y\_\text{offset})-(\theta c+\theta c\_\text{offset}) \quad (2)$$

In the case of the M reference starting from the photoconductive drum 40M, the relative phase difference eMY of the photoconductive drum 40Y and the relative phase difference eMC of the photoconductive drum 40C can be calculated, respectively, by Expressions (3) and (4) below.

$$eMY=(\theta m+\theta m\_\text{offset})-(\theta y+\theta y\_\text{offset}) \quad (3)$$

$$eMC=(\theta m+\theta m\_\text{offset})-(\theta c+\theta c\_\text{offset}) \quad (4)$$

In the case of the C reference starting from the photoconductive drum 40C, the relative phase difference eCY of the photoconductive drum 40Y and the relative phase difference eCM of the photoconductive drum 40M can be calculated, respectively, by Expressions (5) and (6) below.

$$eCY=(\theta c+\theta c\_\text{offset})-(\theta y+\theta y\_\text{offset}) \quad (5)$$

$$eCM=(\theta c+\theta c\_\text{offset})-(\theta m+\theta m\_\text{offset}) \quad (6)$$

In the case of the numerical example of each parameter described above, after the processing in step S301, the followings are obtained: eYM=−20, eYC=−130, eMY=−20, eMC=110, eCY=−130, and eCM=−110.

In step S302 to 305, the relative-phase-difference calculation unit 78 converts the relative phase angles calculated in step S301 into values less than one round (0 or more and less than 360) in the rotational direction.

The parameter "e ##" described in steps S302 and S304 is a collective expression of six parameters eYM, eYC, eMY, eMC, eCY, and eCM. If each parameter has a negative value (Yes in S302), 360 is added (S303). If each parameter has a value of 360 or more (Yes in S304), 360 is subtracted (S305).

In the case of the numerical example of each parameter described above, after the processing in steps S302 to 305, the followings are obtained: eYM=350, eYC=230, eMY=340, eMC=110, eCY=230, and eCM=250.

In step S306, the reference drum 40S is selected by the reference selection unit 79. A larger one of the two relative phase angles is selected for each starting drum (Max(e ##)). Further, the drum having the smallest color (Min(Max(eY #), Max(eM #), Max(eC #)) among the relative phase angles selected for each starting drum is set as the reference drum 40S.

In the case of the numerical example of each parameter described above, first, obtained are large values for the Y reference: eYM=350, the M reference: eMY=340, and the C reference: eCM=250. Then, because eCM is the smallest value among these values, the photoconductive drum 40C as the starting point of the reference C is selected as the reference drum 40S.

In steps S307 to S309, the correction control unit 80 sets the target phases (phase correction values) of the other drums on the basis of the reference drum 40S selected in step S307.

In step S307, because the photoconductive drum 40Y as the starting point of the reference Y is selected as the reference drum 40S, the target phases (phase correction values) are set such that the photoconductive drum 40Y is 0, the photoconductive drum 40M is −eYM, and the photoconductive drum 40C is −eYC.

In step S308, because the photoconductive drum 40M as the starting point of the reference M is selected as the reference drum 40S, the target phases (phase correction values) are set such that the photoconductive drum 40Y is −eMY, the photoconductive drum 40M is 0, and the photoconductive drum 40C is −eMC.

In step S309, because the photoconductive drum 40C as the starting point of the reference C is selected as the reference drum 40S, the target phases (phase correction values) are set such that the photoconductive drum 40Y is −eCY, the photoconductive drum 40M is −eCM, and the photoconductive drum 40C is 0.

In the case of the numerical example of each parameter described above, the reference C is selected in step S307. Thus, after the processing of step S309, obtained are the target phase Y: −230, the target phase M: −250, and the target phase C: 0.

The reference selection unit 79 of the image forming apparatus 100 of the present embodiment selects, as the reference drum 40S (reference image bearer), the drum having the minimum phase correction value on the basis of the calculation result from the relative-phase-difference calculation unit 78, among the plurality of photoconductive drums 40. With the plurality of motors 71 being driven, the correction control unit 80 controls the rotational position of each of the drums other than the reference drum 40S of the plurality of photoconductive drums 40, to the phase correction value with reference to the reference drum 40S obtained by the reference selection unit 79.

As a result, phase alignment for the plurality of photoconductive drums 40 can be performed efficiently, and the image density unevenness can be reduced suitably.

Further, in the present embodiment, the angles at the time when the position detection of the photoconductive drums 40 is completed are stored as θy, θm, and θc. The processing of the flow illustrated in FIG. 11 is performed at the time of calculation with the target phases of the density unevenness phase calculation results as θy_offset, θm_offset, and θc_offset, and calculation is performed so as to minimize the mount of target position correction. If the amount of target position correction can be minimized, the time for the phase alignment can be shortened.

The present embodiment has been described above with reference to the specific examples. The present disclosure, however, is not limited to the specific examples. Design changes appropriately made by those skilled in the art to the specific examples are also included in the scope of the present disclosure as long as those have the features of the present disclosure. Each element included in each of the above specific examples and the disposition, conditions, shapes, and the others of the element are not limited to those exemplified, and thus can be changed appropriately. Each element included in each of the above specific examples can be appropriately combined as long as no technical contradiction occurs. Any one of the above-described operations may be performed in various other ways, for example, in an order different from the one described above.

The invention claimed is:

1. An image forming apparatus, comprising:

a plurality of image bearers;

a plurality of motors to drive to rotate the plurality of image bearers in one-on-one correspondence; and a reference position detector to detect a rotational position of each of the plurality of image hearers; and processing circuitry to:

sense a density of a toner image formed on each of the plurality of image bearers;

form a predetermined image pattern and sense, based on a detection result of the reference position detector and a sensing result of the density of the toner image, density unevenness in a rotation cycle of each of the plurality of image bearers and a phase of the density unevenness with respect to a rotational position reference of each of the plurality of image bearers;

calculate, based on the phase of the density unevenness sensed, a target phase of each of the plurality of image bearers;

calculate, based on the rotational position detected by the reference position detector and the target phase calculated, a relative phase difference of each of the plurality of image bearers;

select, as a reference image bearer, an image bearer having a phase correction value that is minimum among the plurality of image bearers, based on a calculation result of the relative phase difference; and control the rotational position of each of the other image bearers, except for the reference image bearer selected, of the plurality of image bearers with respect to the reference image bearer to the phase correction value, with the plurality of motors being driven.

2. The image forming apparatus according to claim 1, further comprising a speed detector to detect a rotational speed of each of the plurality of motors, wherein the processing circuitry is to:

determine whether a rotational speed of each of the plurality of image bearers has converged at a target speed; and determine whether the plurality of motors have been driven, based on a result of determining whether the rotational speed of each of the plurality of image hearers has converged at the target speed.

3. The image forming apparatus according to claim 1, wherein the processing circuitry is to cause corresponding one of the plurality of motors to decelerate, each of the other image bearers in conn the rotational position to the phase correction value.

4. The image forming apparatus according to claim 1, wherein the processing circuitry is to cause corresponding one of the plurality of motors to accelerate each of the other image bearers in controlling the rotational position to the phase correction value.

* * * * *